US005143637A

United States Patent [19]

Yokouchi et al.

[11] Patent Number: 5,143,637

[45] Date of Patent: Sep. 1, 1992

[54] MAGNETIC FLUID COMPOSITION

[75] Inventors: Atsushi Yokouchi, Yokohama; Toshikazu Yabe, Yurigaoka, both of Japan

[73] Assignee: Nippon Seiko Kabushiki Kaisha, Tokyo, Japan

[21] Appl. No.: 657,180

[22] Filed: Feb. 15, 1991

[30] Foreign Application Priority Data

Feb. 20, 1990 [JP] Japan .................................... 2-38705

[51] Int. Cl.[5] .......................... C09K 3/00; H01F 1/28

[52] U.S. Cl. .............................. 252/62.52; 252/62.51; 252/315.2; 427/214; 427/216

[58] Field of Search ............... 252/62.52, 62.51, 315.2; 427/214, 216

[56] References Cited

U.S. PATENT DOCUMENTS

| | | | |
|---|---|---|---|
| 3,531,413 | 9/1970 | Rosensweig | 252/62.62 |
| 3,635,819 | 1/1972 | Kaiser | 210/40 |
| 3,652,761 | 3/1972 | Weetall | 424/12 |
| 3,700,595 | 10/1972 | Kaiser | 252/62.56 |
| 3,784,471 | 1/1974 | Kaiser | 252/21 |
| 3,796,660 | 3/1974 | Kaiser | 210/21 |
| 3,806,449 | 4/1974 | Kaiser | 210/40 |
| 3,862,047 | 1/1975 | Weltman et al. | 252/62.52 |
| 3,917,538 | 11/1975 | Rosensweig | 252/62.51 |
| 4,019,994 | 4/1977 | Kelley | 252/62.52 |
| 4,094,804 | 6/1978 | Shimoiizaka | 252/62.52 |
| 4,356,098 | 10/1982 | Chagnon | 252/62.51 |
| 4,448,846 | 5/1984 | Chang et al. | 428/412 |
| 4,485,024 | 11/1984 | Furumura | 252/62.56 |
| 4,526,836 | 7/1985 | Mukai et al. | 428/421 |
| 4,526,837 | 7/1985 | Ohtsuki et al. | 428/425.9 |
| 4,554,088 | 11/1985 | Whitehead et al. | 252/62.54 |
| 4,560,616 | 12/1985 | Okita et al. | 428/423.1 |
| 4,560,617 | 12/1985 | Nishimatsu et al. | 428/423.1 |
| 4,601,947 | 7/1986 | Shimada et al. | 428/336 |
| 4,614,687 | 9/1986 | Nishimatsu et al. | 428/329 |
| 4,619,855 | 10/1986 | Okita et al. | 428/143 |
| 4,634,633 | 1/1987 | Ninomiya et al. | 428/425.9 |
| 4,672,040 | 6/1987 | Josephson | 436/526 |
| 4,678,708 | 7/1987 | Shimada et al. | 428/336 |
| 4,690,870 | 9/1987 | Okita et al. | 428/425.9 |
| 4,695,392 | 9/1987 | Whitehead et al. | 252/62.54 |
| 4,695,393 | 9/1987 | Whitehead et al. | 252/62.54 |
| 4,698,280 | 10/1987 | Mine et al. | 428/425.9 |
| 4,701,276 | 10/1987 | Wyman | 252/62.52 |
| 4,708,909 | 11/1987 | Ohtsuki et al. | 428/425.9 |
| 4,713,293 | 2/1987 | Asano et al. | 428/403 |
| 4,732,813 | 3/1988 | Huisman et al. | 428/425.9 |
| 4,734,326 | 3/1988 | Nishimatsu et al. | 428/328 |
| 4,946,613 | 8/1990 | Ishikawa | 252/62.52 |
| 4,956,113 | 9/1990 | Kanno | 252/62.52 |
| 4,976,883 | 12/1990 | Kanno | 252/62.52 |

FOREIGN PATENT DOCUMENTS

| | | |
|---|---|---|
| 57-141547 | 9/1982 | Japan . |
| 58-174495 | 10/1983 | Japan . |
| 61-263202 | 11/1986 | Japan . |
| 0113404 | 5/1987 | Japan . |
| 8302620 | 8/1983 | PCT Int'l Appl. . |

*Primary Examiner*—Prince Willis, Jr.
*Assistant Examiner*—Thomas Steinberg
*Attorney, Agent, or Firm*—Basile and Hanlon

[57] ABSTRACT

A heat-resistant, water-resistant, low-viscosity magnetic fluid and a process for producing same has a dispersion medium made of a low-volatile organic solvent, a low molecular weight dispersant having a lipophilic group and a polar group, the lipophilic group having an affinity for the organic solvent, ferromagnetic particles dispersed in the organic solvent, the surface of each of the ferromagnetic particles being covered with the dispersant, and an additive added to the dispersion medium having a lipophilic group and a polar group, the lipophilic group having a macromolecular chain. The process includes a step of adding the additive to the dispersion medium. The lipophilic group includes a macromolecular chain. The magnetic fluid is suitable for service, e.g., in a shaft seal.

12 Claims, 2 Drawing Sheets

MAGNETIC FLUID COMPOSITION

FIELD OF THE INVENTION

The present invention relates to a heat-resistant, water-resistant, low-viscosity magnetic fluid suitable for service in shaft seals, e.g., of vacuum devices, and hard disc drives of computers, and to a process for producing the magnetic fluid.

DESCRIPTION OF THE RELATED ART

A magnetic fluid comprises ferromagnetic particles, a carrier (dispersion medium) and a dispersant. Ferromagnetic particles adsorb or bond with the dispersant to uniformly disperse in the carrier.

Placing the magnetic fluid under a high temperature or a high humidity causes ferromagnetic particles to desorb from the dispersant and to adsorb water molecules invading the carrier so that the water molecules replace the dispersant. Thus, the ferromagnetic particles irreversively desorb from the dispersant. This promotes the agglutination of the ferromagnetic particles, so that the magnetometric gels increase in viscosity and lose their initial character. This is problem on a sealing magnetic fluid which requires a low-torque characteristic.

Prior-art magnetic fluids, the natures of which were variously improved in order to increase the heat-resistance and the water-resistance thereof have been provided. For example, U.S. Pat. No. 3,700,595 discloses a magnetic fluid with polybutene succinic acid used as a dispersant therein.

In accordance with the prior-art magnetic fluids, since the dispersants added in order to increase the heat-resistance and water-resistance of the magnetic fluids are oligomers or polymers, which have a high molecular weight, the use of amounts of the dispersants sufficient to disperse ferromagnetic particles result in an increase in the viscosity of the magnetic fluids. Therefore, it has been unsuitable that dispersants of oligomers or polymers be used in a sealing magnetic fluid which must have a low-torque performance. That is, the prior-art magnetic fluids entail a problem in that an increased heat-resistance and an increased water-resistance thereof results in an increase of the viscosity thereof and, on the other hand, a reduced viscosity results in a decrease of the heat-resistance and water-resistance thereof.

SUMMARY OF THE INVENTION

Therefore, an objective of the present invention is to provide a heat-resistant, water-resistant, low-viscosity magnetic fluid and a process for producing the same.

In order to achieve the objective, a magnetic fluid of a first aspect of the present invention consists essentially of: a dispersion medium made of a low-volatile organic solvent; a low molecular weight dispersant having a lipophilic group and a polar group, the lipophilic group having an affinity for the organic solvent; ferromagnetic particles dispersed in the organic solvent, the surface of each of the ferromagnetic particles being covered with the dispersant; and an additive added to the dispersion medium and having a second lipophilic group and a second polar group, the second lipophilic group having a macromolecular chain.

The macromolecular chain of the additive is preferably made of a hydrocarbon chain with 25–1,500 carbons. The hydrocarbon of the additive may be selected from the group consisting of polystyrene, polypropylene, polybutene, polybutadiene, poly (1-decene) and each copolymer made of corresponding monomers thereof, and mixtures thereof. The polar group of the additive may be carboxyl group or sulfonic group. The content of the additive is preferably 0.5–30 wt. %.

A process for producing a magnetic fluid of a second aspect of the present invention comprises the steps of: adding to ferromagnetic particles a low boiling point, nonpolar organic solvent and a dispersant which has a lipophilic group having an affinity for the organic solvent, bonding the dispersant with the surfaces of the ferromagnetic particles; then eliminating the low boiling point nonpolar organic solvent to obtain the ferromagnetic particles the surfaces of which are covered with the dispersant; then washing the resulting ferromagnetic particles with a low boiling point polar organic solvent; and then mixing the washed ferromagnetic particles with a low-volatile organic solvent and an additive which has both a second lipophilic group with a macromolecular chain and a second polar group.

A process for producing a magnetic fluid of a third aspect of the present invention comprises the steps of: adding to ferromagnetic particles a low boiling point nonpolar organic solvent and a dispersant which has a lipophilic group having an affinity for the organic solvent and which covers the surfaces of the ferromagnetic particles to produce an intermediate in which the ferromagnetic particles, the surfaces of which have been covered with the dispersant, uniformly disperse in the low boiling point nonpolar organic solvent; washing the intermediate with a low boiling point polar organic solvent; separating the poorly dispersed part of the ferromagnetic particles of the intermediate prior to or after the washing step; adding a low-volatile organic solvent to the intermediate from which the poorly dispersed part of the ferromagnetic particles has been separated to produce a mixture of the low-volatile organic solvent and the intermediate; heating the mixture to evaporate both the low boiling point organic solvents off of the mixture so as to produce a magnetic fluid core; and adding to the magnetic fluid core an additive having a second lipophilic group and a second polar group, the second lipophilic group having a macromolecular chain. The low-volatile organic solvent adding step may alternatively comprise the additive adding step.

DESCRIPTION OF THE PREFERRED EMBODIMENTS

Figure 1:
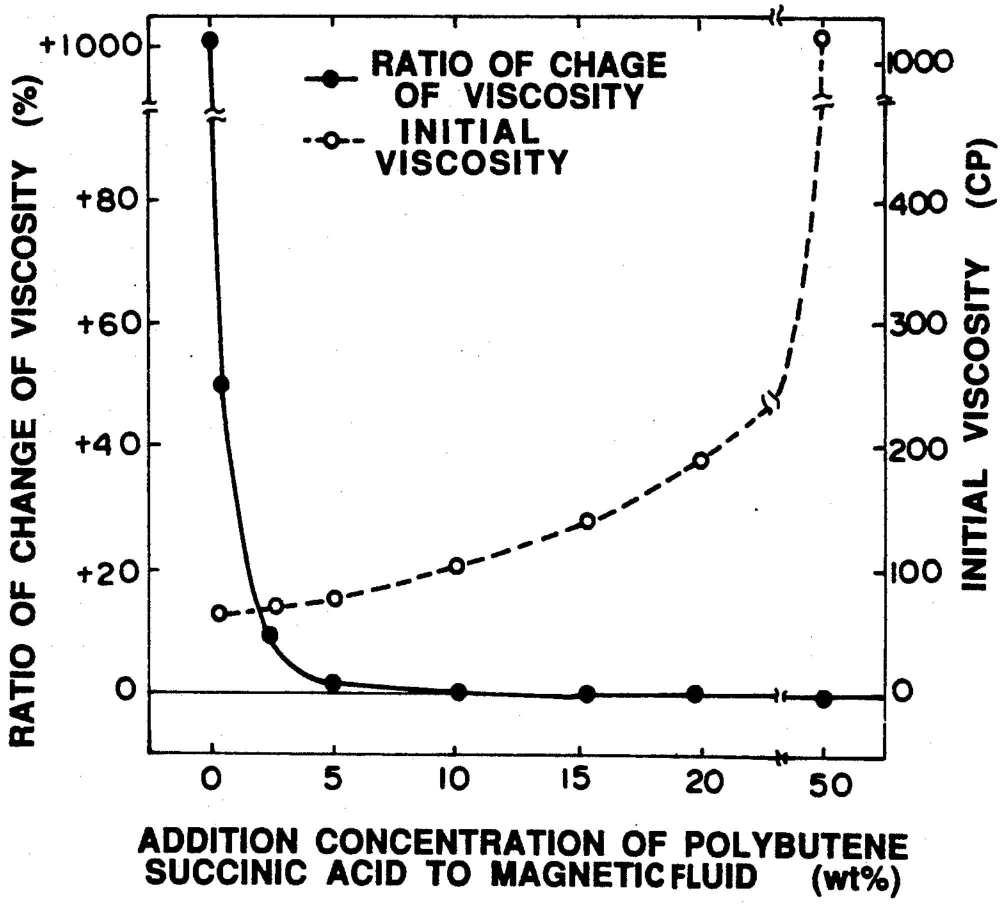
FIG. 1 is a characteristic graph of a relationship between the addition concentration of polybutene succinic acid constituting a additive to a magnetic fluid core, the ratio of change of viscosity of the magnetic fluid of the present invention, and the initial viscosity thereof.

The present inventors discovered that an addition of a surfactant having both a lipophilic group with a macromolecular chain and a polar group as the additive to a carrier but not a dispersant to a magnetic fluid core produced a more heat-resistant, more water-resistant, low-viscosity magnetic fluid which is capable of continuously maintaining its low viscosity.

Generally, magnetic fluids which comprise a low molecular weight dispersant in order to prevent an increase in their viscosity cause the ferromagnetic particles thereof to desorb from the dispersant under a high-temperature high-humidity environment. In this case, water invading a carrier (dispersion medium) adsorbs the dispersant or molecules of the dispersant aggregate to each other to produce micelles. This makes it difficult for a desorption area of each of the ferromagnetic particles to reabsorb the dispersant. The desorption of the dispersant coheres ferromagnetic particles in the manner described above.

A part of each of the ferromagnetic particles of the magnetic fluid of the present invention, which part has preferentially adsorbed the additive of the present invention, desorbed the dispersant to avoid the cohesion of the ferromagnetic particles. Since the additive of the magnetic fluid of the present invention has the lipophilic group made of the macromolecular chain, the affinity of the additive for water was relatively low so that no micelles of water and the additive were produced and so that the ferromagnetic particles preferentially adsorbed the additive. This increased the heat-resistance and the water-resistance of the magnetic fluid.

Generally, when a macromolecular surfactant is employed as the dispersant, a 30 wt. % or more content of the macromolecular surfactant has been conventionally required in view of maintaining the dispersion of ferromagnetic particles. The 30 wt. % or more content of the macromolecular surfactant must increase the viscosity o the magnetic fluid; although it also increases the heat-resistance and the water-resistance of the magnetic fluid.

Since the present invention employed both the low molecular weight surfactant constituting the dispersant and the surfactant having the macromolecular lipophilic group and constituting the additive, an added amount of the surfactant constituting the additive was low. Thus, the present invention avoided an increase in the viscosity of the magnetic fluid and maintained its initial low viscosity. The additive of the present invention enabled the employment of the low molecular weight surfactant since the part of each of the magnetic particles which has desorbed the dispersant preferentially adsorbed the additive as described above. This also avoided an increase in the viscosity of the magnetic fluid.

In addition, since the hydrophobicity of the additive is high, adding the additive to the carrier did not increase the water absorbing force of the carrier.

Each of the lipophilic groups of the additives of the present invention comprises the macromolecular chain. Corresponding macromolecular chains comprise aliphatic hydrocarbons and aromatic hydrocarbons. The aliphatic hydrocarbons comprise, e.g., polyethylene, polypropylene, polybutene, polybutadiene, poly (1-decene) and copolymers or cooligomers of monomers thereof. Corresponding polybutenes comprise polybutene in a narrow sense constituting a polymer of mixtures of isobutene (=isobutylene) and normal butene (1-butene, 2-butene), polyisobutene consisting a homopolymer of isobutenes and polybutene-1 constituting an isotactic polymer of butene-1.

The aromatic hydrocarbons comprise, e.g., polystyrene, poly (p-divinylbenzene) and copolymers or cooligomers of monomers of polystyrene and poly (p-divinylbenzene) and aliphatic hydrocarbon monomers, such as ethylene.

The carbon number of the macromolecular chain of the additive is preferably 25–1,500. A macromolecular chain of the additive with a less than 25 carbon number provides an insufficient hydrophobicity to the additive so that the part of each of the ferromagnetic particles which had desorbed the dispersant failed to preferentially adsorb the additive. This results in insufficient increases in the heat-resistance and the water-resistance of the magnetic fluid. On the other hand, a macromolecular chain of the additive with a carbon number above 1500 significantly increased the viscosity of the magnetic fluid. Thus, the carbon number of the macromolecular chain of the additive preferably is between 25–1,500.

The content or addition concentration of the additive is preferably 0.5–30 wt. % of the magnetic fluid. A below 0.5 wt. % content of the additive insufficiently increased the heat-resistance and the water-resistance of the magnetic fluid. On the other hand, an above 30 wt. % content of the additive significantly increased the viscosity of the magnetic fluid so that the magnetic fluid failed to have the desired low-torque characteristic.

The molecular weight of the additive preferably is between 500–20,000. A below 500 molecular weight of the additive provided an insufficient hydrophobicity to the additive to decrease the heat-resistance and the water-resistance of the magnetic fluid. On the other hand, a molecular weight of the additive above 20,000 significantly increased the viscosity of the magnetic fluid.

Polar groups of the additive comprise, e.g., cationic and anionic groups of carboxylate, sulfate ester, phosphate, sulfate, phosphorate and amine salt. The polar groups of the additive may comprise a plurality of polar groups bonding a macromolecular chain. Examples of the latter polar groups comprise polybutene succinic acid, polyisobutylene succinic acid, sodium polybutene sulfonate, sodium poly-α-olefinsulfonate [$RCH{=}CH(CH_2)_nSO_3Na$, where R represents $C_nH_{2n+1}$]. An employment of each of the additives provided the low-viscosity (50–150 cp at 40° C.) magnetic fluid.

Low-volatile organic solvents constituting the dispersion medium, i.e., carrier for the ferromagnetic particles, are low-volatile organic solvents of a $1\times10^{-10}-1\times10^{-3}$ Torr vapor pressure at 20° C. suitable for a use of the magnetic fluid. They comprise, e.g., mineral oils, synthetic oils, ethers, esters and silicone oil. For example, poly (α-olefin) oil, alkylnaphthalene oil hexadecyldiphenyl ether, a mixture of hexadecyldiphenyl ether and octadecyldiphenyl ether, eicosylnaphthalene and tri-2-ethylhexyl trimellitate are preferably employed as a sealing agent for a magnetic disc drive.

The ferromagnetic particles of the present invention are, e.g., a magnetite colloid produced by a well-known wet process. Alternatively, they may be a product by the so-called wet grinding process in which a ball mill grinds powder of magnetite in water or an organic solvent.

In the wet grinding process, a sufficient amount of dispersion medium described below to form a monomolecular layer on the surfaces of the particles of the magnetite powder (or ferromagnetic powder) may be added and then the ball mill may grind the magnetite powder for a few hours or more when a liquid abrasive is not water, but an organic solvent such as hexane.

The ferromagnetic particles may also comprise particles made of ferromagnetic oxides, such as manganese ferrite, cobalt ferrite, combined ferrites of each of these ferrites and zinc or nickel, and barium ferrite and particles made of ferromagnetic metals, such as iron, cobalt and rare earth metals.

In addition, the ferromagnetic particles may be derived from a product by a dry process in addition to the products by the wet process and the wet grinding process.

The content of the ferromagnetic particles may be as high as 70 vol % as needed in addition to a conventional 1-20 vol %. In accordance with the present invention, the use of an intermediate in which the ferromagnetic particles dispersed in the low boiling point organic solvent as described below allowed the content of the ferromagnetic particles to be very high, i.e. as much as 70 vol %. This produced a magnetic fluid with a very high saturated magnetization.

The dispersant for the ferromagnetic particles preferably is a substance of a 550 or less molecular weight having a good affinity for the low-volatile organic solvent providing the carrier. The dispersant is selected appropriately from the group of anionic surfactants made of hydrocarbons having a polar group, such as carboxyl, hydroxyl or a sulfonic group, these hydrocarbons comprising, e.g., oleic acid, oleate, petroleum sulfonic acid, petroleum sulfonate, synthetic sulfonic acid, synthetic sulfonate, eicosylnaphthalene sulfonic acid, eicosylnaphthalene sulfonate, polybutene succinic acid, polybutenesuccinate, elaidic acid, salts of elaidic acid, erucic acid and salts of erucic acid, nonionic surfactants made, e.g., of polyoxyethylenenonylphenyl ether, and amphoteric surfactants the molecular structural formula of which has both cationic and anionic parts, such as alkyldiamino ethyl glycine.

The dispersants also comprise the so-called coupling agents. The coupling agents comprise, e.g., a coupling agent of silane represented by the general formula $(Y_pR)_{4-n}SiX_n$ (p represents one or more integers and n represents integers 1-3) or $R_{4-n}SiX_n$ (n represents integers 1-3), where Y represents an organic functional group, such as a vinyl group, an epoxy group, an amino group or a mercapto group, R represents a hydrocarbon group, such as alkyl group, and X represents a hydrolytic group, such as alkoxyl group (RO—) selected from the group, e.g., of a methoxy group ($CH_3O$) and an ethoxy group ($C_2H_5O$—).

The alkoxyl group of the silane coupling agent is hydrolyzed by the water content in the air or water adsorbed on an inorganic substance to produce silanol group (—Si—OH). On the other hand, the surface of each of the ferromagnetic particles has an hydroxyl group (-OH) so that the ferromagnetic particle forms M—OH.

It is assumed that the silanol group of the silane coupling agent and the M—OH of the ferromagnetic particle undergo dehydration condensation to bond to each other by a metasiloxane bond (i.e., Si—O—M).

A silane coupling agent represented by the general formula $(Y_pR)_{4-n}SiX_n$ is, e.g., vinyltriethoxy silane. A silane coupling agent, represented by the general formula R-n$SiX_n$, is e.g., octadecyltrimethoxy silane.

A silane agent represented by the general formula $(YPR)_{4-n}SiX_n$ is, e.g. vinyltriethoxy silane. A silane coupling agent represented by the general formula $R_{4-n}SiX_n$, is e.g., octadecyltrimethoxy silane.

Coupling agents other than the silane coupling agents comprise, e.g., aluminum coupling agents made of acetoalkoxy aluminum diisopropylate appropriate to a nonaqueous system, coupling agents of titanate and coupling agents of chromium. The molecular structure of each of these coupling agents contains both an alkoxyl group to bond a hydroxyl (—OH) and a portion having an affinity for an organic substance, e.g., an alkoxyacetoacetic acid group. Thus, these coupling agents and each of the ferromagnetic particles together form a stout lipophilic film on the ferromagnetic particle so that the alkokyl group of the coupling agent and the hydroxyl group bonding the surface of each of the ferromagnetic particles constitutes a hydrophilic solid chemically bound to each other.

It is best to add a sufficient amount of each of the coupling agents to cover the overall surface of each of the ferromagnetic particles with a monomolecular layer of the coupling agent. The added amount of the coupling agent was determined in view of the specific surface and water content of the ferromagnetic particles, the hydrolysis of the coupling agent and a difference in the conditions of the lipophilic film formation.

A process for producing a magnetic fluid core disclosed in Japanese Patent Laid-Open publication no. SHO 58-174495 filed by the present inventors in Japan may be employed in order to efficiently produce the magnetic fluid core of the magnetic fluid of the present invention if a person desires to efficiently eliminate poorly dispersed ferromagnetic particles of the ferromagnetic magnetic fluid core or if he desires to increase the content of the ferromagnetic particles dispersed in the carrier to thereby obtain a magnetic fluid core having a high saturated magnetization.

The process disclosed in Japanese Patent Laid-Open publication no. SHO 58-174495 will be described in detail hereinafter.

First, ferromagnetic particles and the dispersant are added to the low boiling point (e.g., 85° C. or less), nonpolar organic solvent, such as hexane, benzene, cyclohexane, carbon tetrachloride or chloroform, to produce an intermediate in which the ferromagnetic particles, each of which has its surface covered with the dispersant dispersed in the low boiling point nonpolar organic solvent. In this case, if the process employs ferromagnetic particles produced by the wet process, a required amount of the dispersant is added to a suspension of these ferromagnetic particles to form a coating layer on each of the ferromagnetic particles. Then the ferromagnetic particles with the coating layers are washed and dried to produce hydrophobic ferromagnetic particles to which the low boiling point nonpolar organic solvent is then added. The nature, use and requirements of the magnetic fluid dictates which of the ferromagnetic particles produced by the various processes are employed.

Second, the intermediate is washed so that the remaining part of the dispersant except the part thereof which is monomolecularly adsorbed on the surfaces of the ferromagnetic particles, i.e., the remaining part comprising part of the dispersant second molecular layer adsorbed on the surfaces of the ferromagnetic particles and part of the dispersant dissolved in the low boiling point nonpolar organic solvent, is eliminated.

With the intermediate not washed, the following phenomena occurs:

The second molecular layer adsorption of the dispersant on the ferromagnetic particles makes the ferromagnetic particles hydrophilic to cohere the ferromagnetic particles. Thus, the ferromagnetic particles increase their affinity for water invading the carrier to desorb the dispersant. On the other hand, part of the dispersant in the low boiling point nonpolar organic solvent, which is not adsorbed, invades the low-volatile organic solvent (described in detail later) constituting the carrier to increase the affinity of the carrier for water, resulting in a decreased water-resistance of the magnetic fluid. Washing liquids for the intermediate comprise low boiling point (e.g., 85° C. or less) polar organic solvents, e.g., alcohols (e.g., methanol and ethanol) and ketones (e.g., acetone and ethyl methyl ketone). Washing the intermediate with one of these low boiling point polar organic solvents transfers both the dispersant second molecular layer adsorbed on the ferromagnetic particles and the dispersant dissolved in the low boiling point nonpolar organic solvent into the one low boiling point polar organic solvent to eliminate these dispersants. In the washing, the ratio of an amount of the low boiling point nonpolar organic solvent to an amount of the low boiling point polar organic solvent determines whether these solvents produce a single-phase or a two-phase system after a mixture thereof. In case of the two-phase system, a low boiling point, polar organic solvent rich phase is separated from the two-phase system and the process advances from the washing step. On the other hand, in case of the single-phase system, since the ferromagnetic particles which have been washed with the single-phase system cohere and deposit, they are sequentially filtered, recovered, dried and redispersed in the low boiling point nonpolar organic solvent before the process advances from the washing step.

Third, the poorly dispersed ferromagnetic particles of the intermediate which has been washed are 5,000–8,000 G centrifuged to separate them from the intermediate. The very low viscosity of the intermediate, which comprises the low boiling point nonpolar organic solvent, makes the centrifugation efficient. The centrifugation may be alternatively done prior to the intermediate-washing step.

Fourth, the low-volatile organic solvent constituting the carrier is mixed with the intermediate. Heating the mixture in the atmosphere or under reduced pressure, evaporates both the low boiling point organic solvent (i.e., the low boiling point nonpolar organic solvent and a low boiling point polar organic solvent invading the intermediate in the intermediate-washing step). Alternatively, heating the intermediate may evaporate both of the low boiling point organic solvents. Then the low-volatile organic solvent may be added to the ferromagnetic particles, and then the low boiling point organic solvents may be further evaporated as needed. This produces a solution of a very stable magnetic fluid core.

In the low-volatile organic solvent adding step, repeated cycles of adding the intermediate to the resulting magnetic fluid core as needed and heating the mixture of the intermediate and the magnetic fluid core may alternatively produce a magnetic fluid in which the content of the ferromagnetic particles is very high and the ferromagnetic particles stably disperse in the carrier.

The additive adding step may be placed after the intermediate-producing step intermediate the process for producing the magnetic fluid or placed at the end of the process for producing the magnetic fluid. The additive may be directly added or a liquid solution of the additive and a solvent may be mixed with the magnetic fluid core to produce a mixture from which the solvent is then evaporated and eliminated. Corresponding solvents comprise, e.g., mineral oils, such as kerosene, benzene, toluene, xylene, alcohol, collosolve, ethylacetate, cellosolve acetate, MEK (i.e., methyl ethyl ketone), MIBK (i.e., methyl isobutyl ketone), 1,1, 1-trichloroethane, chloroform, carbon tetrachloride, DMF (i.e., dimethylformaldehyde) and ethyl acetate.

When the additive adding step is placed in the intermediate-producing step, the additive which has been dissolved in the low boiling point nonpolar organic solvent employed in the intermediate-producing step (e.g., hexane) may be alternatively added. Alternatively, the additive mixed with the carrier of the magnetic fluid core, i.e., the organic solvent such as the various hydrocarbons, synthetic oils, ethers or esters, may be added. Alternatively, the process for producing the magnetic fluid may not include the intermediate-producing step. In this case, the alternative process for producing the magnetic fluid consists essentially of: adding to ferromagnetic particles a low boiling point nonpolar organic solvent and a dispersant which has a lipophilic group having an affinity for the low boiling point nonpolar organic solvent to bond the dispersant with the surfaces of the ferromagnetic particles; then eliminating the low boiling point nonpolar to obtain the ferromagnetic particles the surfaces of which are covered with the dispersant; then washing the resulting ferromagnetic particles with a low boiling point polar organic solvent; then drying the washed ferromagnetic particles; and then mixing the dried ferromagnetic particles with a low-volatile organic solvent and with the additive.

This completes the present description of the process disclosed in Japanese Patent Laid-Open Publication No. SHO 58-174495.

The preferred embodiments of the present invention will be described hereinafter.

EXAMPLE 1

Example 1 comprises the additive adding step placed at the end of the process for producing the magnetic fluid.

6N of NaOH aq. was added to a 1-liter aqueous solution including a 0.3-mol iron (II) sulfate and a 0.3-mol iron (III) sulfate until the pH value of the resulting watery mixture became 11 or more. Aging the watery mixture at 60° C. for 30 minutes produced a slurry of magnetite colloid. Washing the slurry with water at a room temperature eliminated an electrolyte from the slurry. This is, the magnetite colloid was produced by the wet process.

3N of HCL aq. was added to the resulting liquid magnetite colloid so as to adjust the pH value of the resulting mixture to be 3. Then, 40 g of sodium synthetic sulfonate constituting a surfactant was added to the mixture to produce another mixture. The latter mixture was agitated at 60° C. for 30 minutes so that the magnetite particles adsorbed the surfactant of sodium synthetic sulfonate. Standing the resulting liquid mixture cohered and deposited the magnetite particles in the liquid mixture. The supernatant of this liquid mixture was discarded. Further, fresh water was added to the resulting magnetite particles to produce a slurry, which was agitated and then stood. The supernatant of this slurry was again discarded. The cycle of water-washing the magnetite particles was repeated a few times to discard the electrolyte out of a slurry of the magnetite particles. Then, filtering, dehydrating and drying the magnetite particles produced powder of magnetite, each particle of which had the surface covered with the surfactant.

Hexane was added to the magnetite powder as the low boiling point nonpolar organic solvent. The resulting mixture was sufficiently shaken to produce a liquid colloidal intermediate in which the magnetite particles dispersed in the hexane.

Methanol was added to the liquid colloidal intermediate as the low boiling point polar organic solvent to cohere and deposit the magnetite particles. The supernatant was discarded. This eliminated the remaining part of the dispersant except for the dispersant monomolecularly adsorbed on the magnetite particles. The deposited magnetite particles were again dispersed in hexane to produce an intermediate.

Centrifuging the resulting intermediate under a 8,000 G for 30 minutes deposited and discarded poorly-dispersed magnetite particles with a relatively large particle size out of the magnetite particles. Then, the supernatant with the remaining magnetite particles not deposited but dispersed was transferred to a rotary evaporator. The evaporator held this supernatant at 90° C. to evaporate and discard the low boiling point organic solvent (i.e., hexane), so that lipophilic magnetite particles were obtained. 5 g of the magnetite particles was redispersed in hexane to again produce an intermediate. 4 g of poly-α-olefin (its average degree of polymerization: trimer) constituting the carrier was added to the resulting intermediate to produce a liquid mixture. This liquid mixture was transferred to the rotary evaporator. The evaporator held the liquid mixture at 90° C. to evaporate the hexane. this dispersed the magnetite particles in the carrier. Further centrifuging the mixture of the magnetite particles and carrier under a 8,000-G force for 30 minutes, separated and discarded a nondispersed solid to produce a very stable magnetic fluid core.

0.5 g of polybutene (in narrow sense) succinic acid of a 1,100 average molecular weight was added as the additive to this magnetic fluid core so that the temperature of the resulting magnetic fluid mixture was 60° C. This magnetic fluid mixture was sufficiently agitated, resulting in the magnetic fluid of the present invention.

Measurement of the Initial Viscosity of the Magnetic fluid

The initial viscosity of the magnetic fluid of Example 1 was measured as 70 cp at 40° C. This viscosity value is sufficiently lower than the initial viscosity (i.e., 800 cp at 40° C.) of a control magnetic fluid with polybutene succinic acid constituting a dispersant, the control magnetic fluid including 45 wt. % of polybutene succinic acid, the same kind and content of ferromagnetic particles as those of the magnetic fluid of Example 1, and the same kind of carrier as that of the magnetic fluid of Example 1.

Test of the Water-resistance of the Magnetic fluid 10 ml of the magnetic fluid of Example 1 was placed in a 50-ml beaker and held at 80° C. in an atmosphere of a 70% relative humidity for 100 hours. Then, measuring the viscosity of the magnetic fluid provided a very low increase in viscosity as 1.5 cp at 40° C. On the other hand, the increase in the viscosity of the control magnetic fluid lacking the polybutene succinic acid employed in Example 1 (the kinds and contents of the components other than the polybutene succinic acid being equal to those of the magnetic fluid of Example 1) was 25 cp at 40° C. under the same conditions as those of the magnetic fluid of Example 1. Thus, the low water-resistance of a magnetic fluid causes the ferromagnetic particles thereof to cohere so that the magnetic fluid must gel to increase its viscosity.

The result of the water-resistance test for the magnetic of Example 1 indicates that no magnetite particles of the magnetic fluid cohered and, thus, the water-resistance of the magnetic fluid of Example 1 was good.

Test of the Heat resistance of the Magnetic fluid 0.8 ml of the magnetic fluid of Example 1 was placed in each of a plurality (e.g., 10–20) of laboratory dishes with a 20-mm inner diameter. The laboratory dishes were placed in a hot-air furnace at 170° C. One laboratory dish was taken out of the hot-air furnace every hour. Each laboratory dish which had been taken out was placed at about a 20° C. room temperature for about 2 hours. Then, the taken out laboratory dishes were inclined and the presence or absence of the fluidity of the magnetic fluid contained in each taken out laboratory dish was confirmed. An amount of heating time passing until the fluidity of the magnetic fluid became zero was defined as a 170° C. solidification time for a sample magnetic fluid and provided a criterion for the heat-resistance of magnetic fluids. A low heat-resistance of magnetic fluids causes the ferromagnetic particles to cohere and gel, resulting in a short solidification time. The same heat-resistance test was conducted for a control magnetic fluid lacking the polybutene succinic acid employed in Example 1 (the kinds and content of the components other than polybutene succinic acid being equal to those of the magnetic fluid of Example 1) in order to obtain solidification times for the control magnetic fluid.

In the results of the heat resistance test, the solidification time for the magnetic fluid of Example 1 was 25 hours and, on the other hand, that of the control magnetic fluid was 9 hours. As is apparent from these results, the heat resistance of the magnetic fluid of Example 1 was much increased.

EXAMPLE 2

Example 2 comprises the additive adding step intermediate the process for producing the magnetic fluid.

Lipophilic magnetite particles from which an excessive dispersant made of the surfactant was eliminated using the low boiling point polar organic solvent were obtained in the same manner as in Example 1. 5 g of the magnetite particles was redispersed in hexane to again produce an intermediate. 4 g of poly-α-olefin (its average degree of polymerization: trimer) constituting the carrier was added to the resulting intermediate. 0.5 g of polybutene (in a narrow sense) succinic acid of a 1,100 average molecular weight was mixed with this intermediate. Then, the resulting mixture was transferred to the rotary evaporator. The evaporator held the mixture at 90° C. to evaporate and discard the low boiling point organic solvent (i.e., hexane). This dispersed the magnetite particles in the carrier. Further centrifuging the mixture of the magnetite particles and carrier under a 8,000-G force for 30 minutes separated and discarded a nondispersed solid to produce a very stable magnetic fluid core.

The initial viscosity of the magnetic fluid of Example 2 was measured by the same procedure as in Example 1. The tests of water-resistance and heat-resistance for the magnetic fluid of Example 2 were also conducted in the same manner as in Example 1.

In the results of the measurement and tests, the initial viscosity of the magnetic fluid of Example 2 was 70 cp at 40° C., the increase in viscosity thereof obtained from the water-resistance test was 1.5 cp at 40° C., and the solidification time therefor obtained from the heat-resistance test was 25 hours. These values indicate that Example 2 also produced the heat-resistant, water-resistant, low-viscosity magnetic fluid and that the additive added to the magnetic fluid core intermediate the process for producing the magnetic fluid had essentially the same advantage as the additive added to the magnetic fluid core at the end of the process for producing the magnetic fluid.

EXAMPLE 3

Example 3 tests relationships between addition concentrations of the additive, initial viscosities and water-resistances of the magnetic fluid.

The initial viscosity of each of magnetic fluids in which only the addition concentration of polybutene succinic acid added at the end of the process for producing the magnetic fluid of Example 1 was changed was measured and the water-resistance of the magnetic fluid was also tested so that the relationship between the water-resistance of the magnetic fluid and the addition concentration of polybutene succinic acid was tested. FIG. 1 depicts a characteristic graph of this relationship.

The ration of change of viscosity $P_1$ (%) was defined by the following equation:

$$P_1 = \frac{P_1 - P_o}{P_o} \times 100,$$

where $P_o$ represents the initial viscosity of the magnetic fluid and $P_1$ represents the viscosity after the water-resistance test of the magnetic fluid.

In general, the low-torque characteristics of the magnetic fluid is as good as the initial viscosity of the magnetic fluid is low and the water-resistance of the magnetic fluid is as good as the ratio of change of viscosity of the magnetic fluid is low.

FIG. 1 teaches that a magnetic fluid of a 0.5–30 wt. % addition concentration has a low initial viscosity and a low ratio of change viscosity.

EXAMPLE 4

Example 4 tests relationships between addition concentrations of the additive and the resistances of the magnetic fluid.

Figure 2:
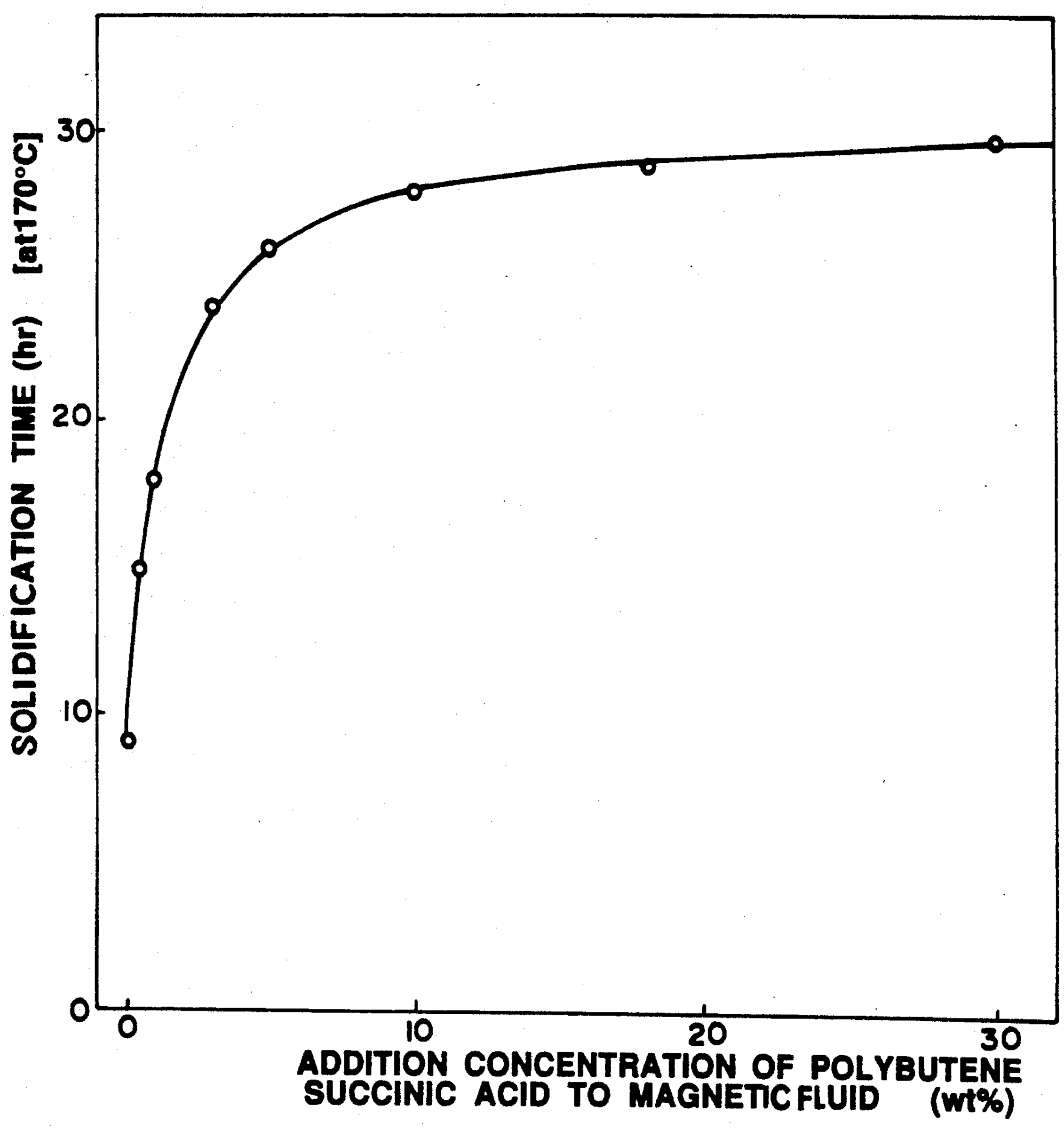
FIG. 2 is a characteristic graph of a relationship between the additive concentration of the polybutene succinic acid to the magnetic fluid and the solidification time for the magnetic fluid.

The same magnetic fluids as the magnetic fluid of Example 1 except that the addition concentration of polybutene succinic acid was variously changed were produced. The relationship between the addition concentration of polybutene (in narrow sense) succinic acid and the solidification time for the magnetic fluid was tested in essentially the same manner as in the heat resistance test of Example 1. FIG. 2 depicts a characteristic graph of this relationship.

FIG. 2 teaches that the solidification time for the magnetic fluid with polybutene succinic acid added is significantly longer than that for a magnetic fluid lacking polybutene succinic acid.

EXAMPLE 5

The same magnetic fluid as that of Example 2 except that the carrier was not made of poly-α-olefin but octadecyldiphenyl ether was produced. The initial viscosity of the magnetic fluid was measured and the water-resistance and the heat resistance thereof were tested by the same procedure as in Example 1.

In the results of these tests, the initial viscosity of the magnetic fluid was 65 cp at 40° C., the increase in viscosity thereof was 1.0 cp at 40° C. and the solidification time therefor was 40 hours. These values indicate that the heat resistance, the water-resistance and the low-torque characteristic of the magnetic fluid were good.

EXAMPLE 6

An intermediate in which the magnetite particles dispersed in hexane was produced in the same manner as in Example 1. The intermediate was then transferred to the rotary evaporator. The evaporator held the intermediate at 90° C. to evaporate and discard the hexane constituting the low boiling point nonpolar organic solvent. Then, methanol constituting the low boiling point polar organic solvent was added to the resulting intermediate to wash the magnetite particles and to eliminate excessive surfactant. Then, the washed magnetite particles were filtered, recovered and dried under reduced pressure at 80° C. for 3 hours.

5 g of octadecyldiphenyl ether constituting the carrier and 0.5 g of sodium polybutene (in a narrow sense) sulfonate of a 500 average molecular weight were added to 10 g of the magnetite particles. A ball mill ground the resulting mixture for 3 hours. Then, the ground mixture was centrifuged under 8,000-G for 50 minutes. This centrifugation eliminated nondispersed solids to produce a very stable magnetic fluid including a polybutene derivative, the derivative including a $OSO_3Na$ group.

The initial viscosity of the magnetic fluid of Example 6 was measured and the water-resistance and the heat resistance thereof were tested in the same manner as in Example The initial viscosity of the magnetic fluid was 62 cp at 40° C. The increase in viscosity thereof was 3.0 cp at 40° C. The solidification time therefor was 21 hours. These values indicate that the heat resistance, the water-resistance and the low-torque characteristic of the magnetic fluid were good.

EXAMPLE 7

The same magnetic fluid as that of Example 6 except that the magnetic fluid of Example 7 had poly-α-olefin as the carrier and polyisobutylene succinic acid of a 20,000 average molecular weight was produced.

The initial viscosity of the magnetic fluid of Example 7 was measured and the water-resistance and the heat resistance thereof were tested in the same manner as in Example The initial viscosity of the magnetic fluid was 100 cp at 40° C. The increase in viscosity thereof was 1.0 cp at 40° C. The solidification time therefor was 30 hours. These values indicate that the heat resistance, the water-resistance and the low-torque characteristic of the magnetic fluid were good.

Various characterizing agents may be added to the magnetic fluid of the present invention in order to provide a desired character, such as conductivity, thereto.

What is claimed is:

1. A magnetic fluid, consisting essentially of:

a dispersion medium made of a low-volatile organic solvent;

ferromagnetic particles dispersed in the organic solvent;

a low molecular weight dispersant having a lipophilic group and a polar group, the lipophilic group having an affinity for the organic solvent, the surface of each of the ferromagnetic particles being covered with the dispersant; and an additive added to the dispersion medium, having a lipophilic group and a polar group, the additive lipophilic group having a macromolecular chain;

wherein the polar group of the additive is at least one of a carboxyl group and a sulfonic group.

2. The magnetic fluid as recited in claim 1 wherein the macromolecular chain of the additive is made of a hydrocarbon with a carbon number between 25 and 1,500.

3. The magnetic fluid as recited in claim 2 wherein the hydrocarbon of the additive is selected from the group consisting of polystyrene, polyethylene, polypropylene, polybutene, polybutadiene, poly (1-decane) and each copolymer made of corresponding monomers thereof.

4. The magnetic fluid as recited in claim 1 wherein the molecular weight of the additive is between 500 and 20,000.

5. The magnetic fluid as recited in claim 2 wherein the molecular weight of the additive is between 500 and 20,000.

6. The magnetic fluid as recited in claim 3 wherein the molecular weight of the additive is between 500 and 20,000.

7. The magnetic fluid as recited in claim 1 wherein the content of the additive is 0.5-30 wt. %.

8. The magnetic fluid as recited in claim 2 wherein the content of the additive is 0.5-30 wt. %.

9. The magnetic fluid as recited in claim 3 wherein the content of the additive is 0.5-30 wt. %.

10. The magnetic fluid as recited in claim 4 wherein the content of the additive is 0.5-30 wt. %.

11. The magnetic fluid as recited in claim 5 wherein the content of the additive is 0.5-30 wt. %.

12. The magnetic fluid as recited in claim 6 wherein the content of the additive is 0.5-30 wt. %.

* * * * *